United States Patent [19]

von Platen

[11] 4,430,051
[45] Feb. 7, 1984

[54] REACTION VESSEL

[75] Inventor: Baltzar C. von Platen, Ystad, Sweden

[73] Assignee: F. D. International, Ltd., London, England

[21] Appl. No.: 213,897

[22] Filed: Dec. 8, 1980

[30] Foreign Application Priority Data

Dec. 20, 1979 [SE] Sweden ................. 7910512

[51] Int. Cl.³ .............. B01J 3/04; B01J 3/06; C01B 31/06; B30B 15/34
[52] U.S. Cl. .............. 425/77; 156/DIG. 68; 423/446
[58] Field of Search ........... 425/77; 264/84; 423/446; 156/DIG. 68

[56] References Cited

U.S. PATENT DOCUMENTS

| 2,479,191 | 8/1949 | Williams et al. | 249/79 |
| 2,554,499 | 5/1951 | Poulter | 425/77 |
| 3,103,699 | 9/1963 | Gerard et al. | 425/77 |
| 3,118,177 | 1/1964 | von Platen | 425/77 |
| 4,003,697 | 1/1977 | Elmgren | 425/77 X |
| 4,113,846 | 9/1978 | Sigurdsson | 425/77 X |

FOREIGN PATENT DOCUMENTS 46-29218  8/1971  Japan .................. 425/77

Primary Examiner—Philip E. Anderson
Attorney, Agent, or Firm—Eric Y. Munson

[57] ABSTRACT

The present invention relates to a reaction vessel adapted to withstand pressures and temperatures of the magnitude associated with the manufacture of diamond products and boron nitride (BN) and similar hard materials. The reaction vessel has an outer chamber or shell formed from steel and an inner reaction chamber. Known vessels of this type must be provided with a thick layer of insulating material between the reaction chamber and the outer steel shell to protect the outer shell from the heat of the diamond-forming process carried on in the reaction chamber. The quantity of insulating material required within the vessel for adequate protection of the outer shell is relatively large as compared to the area of the outer shell. Accordingly, the amount of available space remaining within the vessel for the diamond-forming reaction is limited, thus limiting the size of the diamonds formed. The present invention provides a reaction vessel with a cooling system which eliminates the need for the large quantity of insulating material in the known vessels. As such, the reaction vessel provides a significantly larger reaction chamber for the diamond-forming process, and the resultant diamonds are up to a thousand times larger than those formed from known reaction vessels. In one embodiment of the invention, the cooling system includes a plurality of truncated steel pyramids arranged to form flow passages or channels for a cooling fluid adjacent to the inner wall of the vessel's outer steel shell to absorb and disperse heat before it penetrates the outer steel shell.

17 Claims, 7 Drawing Figures

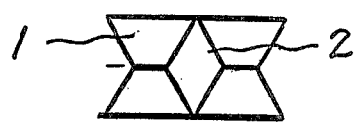
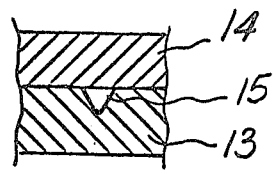
FIG. 1  FIG. 2
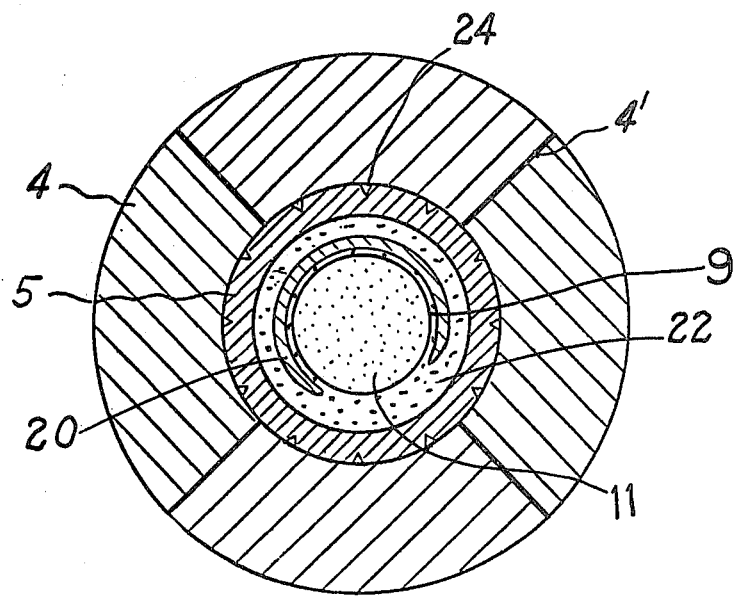
FIG. 4

REACTION VESSEL

FIELD OF THE INVENTION

The invention provided herein relates to a reaction vessel of the type designed to withstand high temperature and high pressure. This type of vessel is commonly used, for example, in the production of diamonds or diamond powder and boron nitride (BN) and similar hard materials.

BACKGROUND OF THE INVENTION

Reaction vessels of the type used for forming diamonds from graphite are generally known to the art. See, for example, the text entitled "Modern Very High Pressure Techniques", edited by R. H. Wentorf, Jr., PhD, General Electric Research Laboratory, published by Butterworths, London, and the next entitled "The Physics of High Pressure" by Bridgeman, to which reference will be made in this disclosure. Also, as background, U.S. Pat. No. 3,118,177, issued to B. C. Von Platen, on Jan. 21, 1964, describes an improved autoclave of the type in which chemical processes may be carried on under extremely high pressure.

Generally speaking, the known diamond-forming reaction vessels include a thick steel outer shell, a large quantity of insulating material adjacent to the inner walls of the outer shell, and a reaction space or chamber within the insulating material. The reaction chamber includes high temperature heating means (e.g. an electric heating element), and a space to position the graphite raw material which will be converted into diamond products by the simultaneous application of high pressure and high temperature. The specific means used to generate the necessary high temperature and high pressure which must be applied to the graphite are conventional and well-known to those skilled in the art.

In the known reaction vessels of the aforementioned type, the insulating material between the central reaction space and the outer steel shell is of significant importance. The heat required for the diamond forming reaction is sufficiently great as to damage the outer steel shell of the reaction vessel and possibly cause it to disintegrate in a relatively short period of time. Thus, the insulating material is necessary to prevent much of this heat from reaching the outer steel shell. Even with the insulating material, the heating means in known reaction vessels must not be turned on for any extended period of time to further avoid damage to the outer shell. In practice, the heating means is switched off usually every few minutes, or in some instances every few seconds. The quantity of insulating material used in the known apparatus is quite large in proportion to the area of the outer steel shell. Accordingly, the actual reaction space provided by the known vessels is quite small and there is usually only enough room to accommodate graphite raw material of the size of approximately one centimeter in diameter. Accordingly, the diamond resulting from the high heat and pressure applied to the graphite in the reaction chamber is quite small.

It is an object of the present invention to provide a reaction vessel of the type adapted to form diamonds from graphite that eliminates most of the insulating material required by the known vessels to thereby provide a significantly larger reaction space within the reaction vessel. Due to the flexibility of the reaction time allowed by the invention, diamonds of a size significantly larger than that resulting from the known reaction vessels can be produced when the graphite is subjected to a relatively long reaction (e.g., months). On the other hand, diamond powder can be produced from a relatively short reaction time (e.g., minutes or seconds).

SUMMARY OF THE INVENTION

The present invention provides an improved reaction vessel of the type adapted to withstand the pressure and heat associated with processes for forming diamonds or diamond powder and boron nitride. In its preferred embodiment, the reaction vessel includes an outer steel shell, an inner concentric steel tube defining a reaction chamber therein, heating means, as, for example, an electric heating coil located within the reaction chamber, and conventional means for applying a large pressure of the magnitude necessary to form diamonds, for example, from graphite. Suitably, a relatively small inner portion of the steel shell may be made, for example, of copper, beryllium or similar strong material. A first container including graphite and a second container including a substance having a high coefficient of expansion such as cooking salt are placed within the reaction space. The remaining unoccupied space in the reaction space may be filled with a suitable insulating substance, as, for example, silver sulphate.

The present reaction vessel provides an improved cooling system between the inner surface of the outer shell and the outer surface of the adjacent concentric inner tube. In one aspect of the invention, the cooling system includes either grooves defined on the outer steel shell or the inner tube, or a plurality of truncated steel pyramids arranged between the outer shell and the inner tube to define a plurality of openings or channels extending either throughout the length of the outer steel shell or around it. These channels provide passageways for the flow of cooling fluid between the outer steel shell and the inner tube. In another embodiment of the invention, the cooling system includes use of thick walled high strength small tubing in which a cooling fluid such as water flows under atmospheric pressure. The exterior or the tubing is in contact with the heat under high pressure in the reaction space, and removes the heat before it penetrates the outer steel shell. In a further aspect of the invention, the cooling system can be formed from known materials which melt at a relatively high temperature when absorbing heat under high pressure. Such materials are positioned between the outer shell and the inner tube.

In any event, the cooling system provided by the present invention occupies a relatively small space and replaces the large quantity of insulating material required in the known reaction vessels. Therefore, the present reaction vessel is capable of providing a significantly larger reaction space than that of the conventional vessels, and thus is capable of holding larger quantities of graphite with the resultant formation of diamonds that are significantly larger than those produced in the known reaction vessels of this type. Additionally, the larger reaction space enables the improved reaction vessel to accommodate a larger electrical coil heater, thus providing more efficient conversion of graphite into diamond or diamond powder. In this connection, it should be explained that, when large diamonds are desired, the process should be carried out at a relatively slow pace, whereas diamond powder can be produced relatively quickly.

Other aspects and features of this invention will become apparent when the invention is discussed in detail in conjunction with the following drawings.

BRIEF DESCRIPTION OF THE DRAWINGS

FIG. 1 of the drawing illustrates four truncated pyramids arranged to form a channel therebetween, as used in the cooling system of the present invention.

FIG. 2 illustrates a projection having a groove milled on a steel plate, as used in accordance with the present invention.

FIG. 4 illustrates a sectional view of the reaction vessel of FIG. 3 at right angles to the vessel's geometric axis taken along line IV-IV of FIG. 3 showing a plurality of grooves defined in an inner housing of the reaction vessel.

DESCRIPTION OF THE PREFERRED EMBODIMENTS OF THE INVENTION

The present invention will be described herein with particular reference to its application for the production of diamonds from graphite, taken in conjunction with FIGS. 1-4 of the drawings. The reaction vessel provides a central reaction chamber significantly larger than previously known, because, as will be discussed below, the invention provides a cooling or insulating system which replaces or eliminates the bulk of insulating material required in the prior art vessels. Simply stated, the cooling systems embodied in the present invention are generally known to low pressure applications, but, it is not heretofore believed that such systems could be useful in high pressure applications of the magnitude encountered in the type of reaction vessel provided herein.

To briefly review what has been discussed herein, known reaction vessels for forming diamonds have a central reaction chamber or space of a size approximately large enough to accommodate a ball of graphite of about one centimeter in diameter. An electric heating filament surrounding the graphite serves to heat it until it is white hot. The reaction chamber described herein is surrounded by a spherical shell of heat insulating material, as, for example, silver sulphate. Because of the extremely high temperatures required in a diamond-forming process, as is known to the art, a large amount of insulating material is required, and thus the bulk or volume of the insulating shell is relatively large in comparison with the reaction space defined therein. The sphere of insulating material is encased within an outer steel protective shell. Without the insulating material, the temperature generated by the reaction in the reaction chamber is sufficiently great to damage or cause the steel shell to disintegrate. Even with the insulation provided, the heating coil must be turned off intermittently for cooling.

Figure 3:
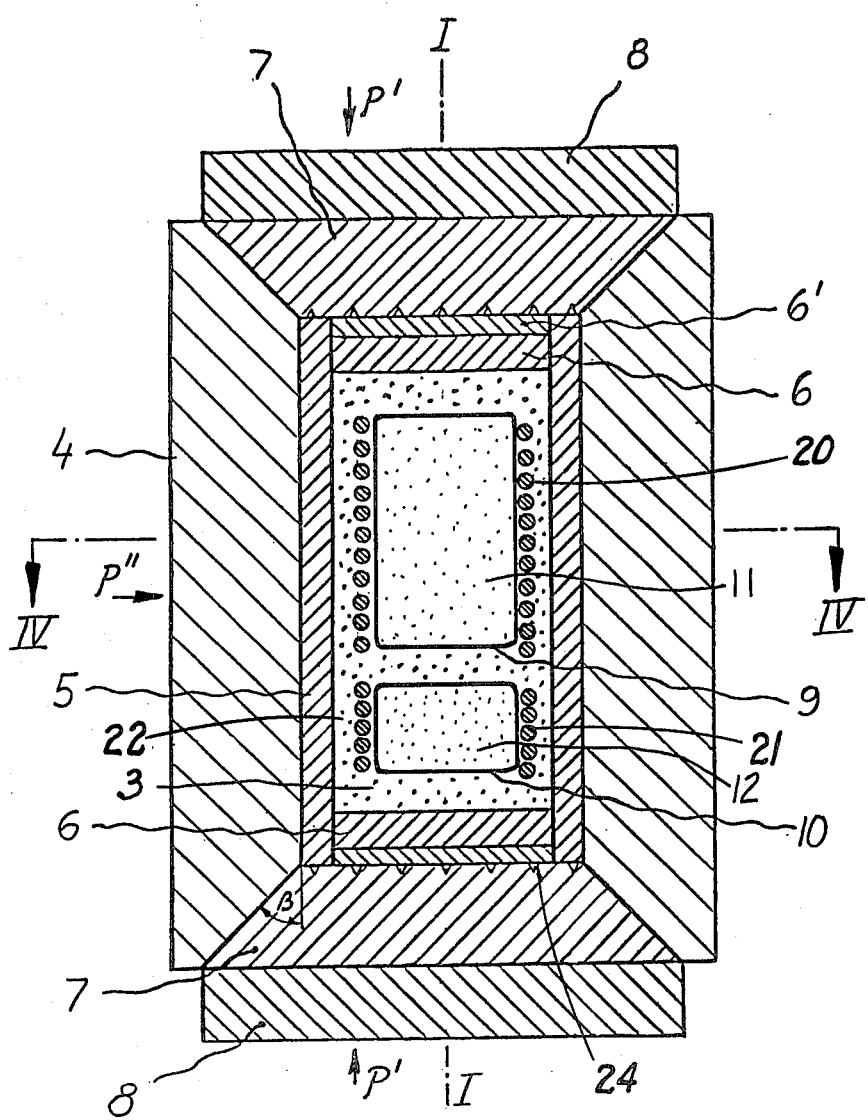
FIG. 3 illustrates a sectional view through the geometric axis I-I of a reaction vessel in accordance with the present invention.

The present invention provides a reaction chamber eliminating most of the insulating material and replacing it with a less cumbersome and less space consuming cooling system. FIGS. 3 and 4 of the drawings illustrate a reaction vessel in accordance with the present invention. The reaction vessel includes a reaction space 3, defined within a central inner tube or cylinder 5 which is relatively thin-walled (e.g., 3 to 4 mm thick) and can be formed from a strong but fairly ductile steel. Adjacent to the outer surfaces of the tube 5 are concave steel pieces 4 which serve as the protective outer shell for the reaction vessel. The plane sectional surfaces of the outer cylinder defined by pieces 4 are designated as 4' (See FIG. 4) and have their geometric extensions passing through the reaction vessel's geometric axis indicated by I-I. Two identical plugs 6, which are positioned at the upper and lower ends of the pieces 4 provide sealing for the ends of the outer shell. The plugs 6 have outer parts 6' which bear upon conical bodies 7 whose half apex angles are indicated by $\beta$ in FIG. 3. Each of the conical bodies is equipped with a cylindrical part 8. The convex surfaces of the conical pieces 7 bear against the concave surfaces of the pieces 4 which form the cylindrical outer shell. The specific pressures indicated by P' and P'' on the outer surface of the outer shell of the reaction vessel are provided by conventional means known to the art. Conventional electric heating coils 20 and 21 are provided within the reaction chamber 3. As will be discussed below, the reaction vessel is formed so that when high pressure is applied to the vessel, the structural components of the vessel tend to support each other.

Two containers, indicated by reference numerals 9 and 10, are positioned within the reaction chamber 3. These containers are preferably thin walled (approximately 1 mm thick) and can be formed from, for example, glass, molybdenum, iron, or other substances. One of the containers, as for example, container 9, holds graphite powder plus the powder of a catalyst such as iron, nickel, or wolfram, among others. In the drawings, both the graphite and catalyst powder are indicated by reference numeral 11. The other container 10 holds a substance 12 having a high coefficient of expansion, as for example, cooking salt. In the alternative, container 10 may be replaced by a solid piece of iron, for example, which will be of larger volume than the container 10, since its coefficient of expansion is lower than that of cooking salt. The remainder of the reaction chamber (that is, between the containers 9 and 10) is filled with a suitable insulating substance 22, as for example, silver sulphate.

It should be noted that the outer part 6' of each of the plugs 6 is formed from a hard metal with a compression strength of more than 50,000 kg per $cm^2$. The inner part of the plug does not have to be as strong, because with rising pressure in the reaction chamber, it receives support from the cylinder 5. As noted above, the pressure applied to the cylinder 5 is indicated in FIG. 3 as P''', and the pressure applied to cylindrical member 8 is P''. Known means for generating such pressure are described in the aforementioned text entitled "Modern Very High Pressure Techniques." Initially, the applied pressure P'' moves element 7 (and 6 and 6') into a close fitting or sealing relationship with the concave surfaces of pieces 4. This procedure can be used to produce mechanically a pressure in the order of 40,000–50,000 atmospheres. That pressure can be increased to about 70,000 atmospheres without the use of further mechanical means, as will be described below.

The elements 4, 6, 6', 7 and 8 of the vessel are preferably formed from hard steel known as C550 or D941 in Sweden.

When the plugs are in sealing relationship with respect to the upper and lower portions of the reaction vessel, plug 6 and portion 6' of the plugs receive support from the cylinder 5, the conical portions of elements 4 and 7 support each other, and the plane surfaces 4' (See FIG. 4) of the pieces 4 also tend to support each other.

The high pressure in the reaction chamber produced from the above described mechanical operation can be of the magnitude of 40,000 to 50,000 atmospheres, or 40-50 Kb (Kilobars). However, greater pressure than this is necessary for the formation of a diamond. Therefore, the container 10 is heated by heater 21, and the cooking salt therein expands as it begins to melt, causing the pressure in the chamber to rise to about 70,000 atmospheres (70 Kb). A 70,000 atmosphere pressure is sufficient to form a diamond, and, when this pressure is achieved within the reaction chamber, the container 9 holding the graphite is selectively heated by the heating element 20 to requisite temperature for diamond formation. As a result of the diamond formation, contraction occurs within the chamber, and the pressure tends to fall. When this occurs, the salt is again selectively heated to its melting point, to again maintain a 70,000 atmosphere pressure within the reaction chamber. This procedure is repeated to maintain a constant pressure within the reaction chamber sufficient for diamond formation until all of the graphite in container 9 has been transformed into diamond.

During the formation of the diamond, a small gap arises due to plastic deformation between the outer parts furthest from the center of the reaction vessel, affecting the originally plane surfaces 4' of pieces 4. These pieces are no longer plane, due to the plastic deformation, but are slightly curved. To avoid damage to the vessel itself, the surfaces 4' could be slightly curved before the reaction occurs, and, in that case, the pieces 4 could be made of harder steel. This would tend to eliminate any damage that might be caused to the reaction vessel as a result of the plastic deformation.

Figure 5:
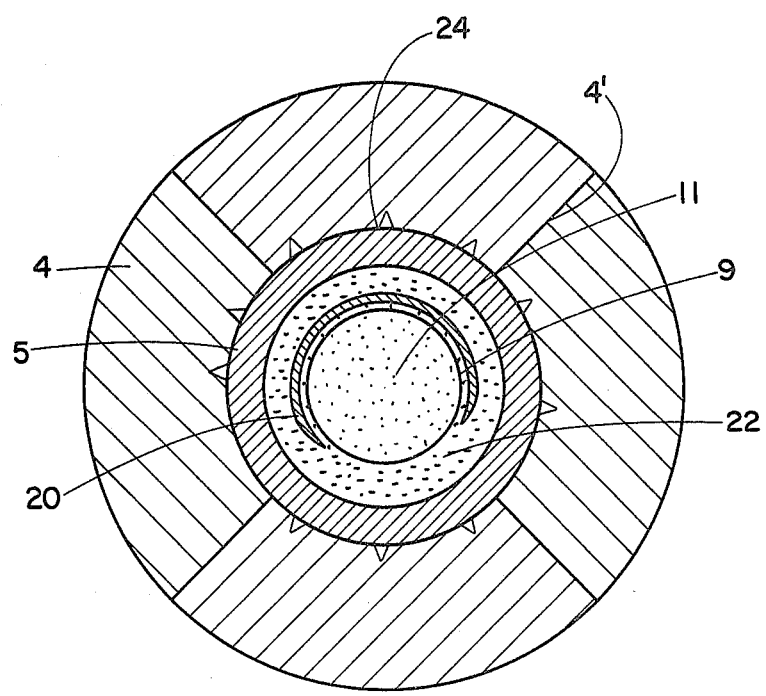
FIG. 5 is a sectional view of a reaction vessel similar to that shown in FIG. 4 except that the plurality of grooves are defined in an outer shell of the reaction vessel.

The cooling system provided by the present invention for preventing damage to the outer steel casing of the reaction vessel is generally illustrated by numeral 24 in FIGS. 3 and 4. This cooling system is shown as fine grooves 24 positioned between the inner arcuate surface of the thick walled outer pieces 4 and the outer surface of the thin walled steel tube 5 in FIG. 3. The grooves 24 can be defined in either the outer surface of the inner tube 5 or the inner surface of the outer pieces 4. In FIG. 4, the grooves 24 are shown defined in the outer surface of the inner housing 5, while in FIG. 5 the grooves 24 are shown defined in the inner surface of the outer shell 4. Such grooves may also be positioned between the upper portion of outer parts 6' of plugs 6 and the lower portions of conical bodies 7. (See FIG. 3).

Figure 6:
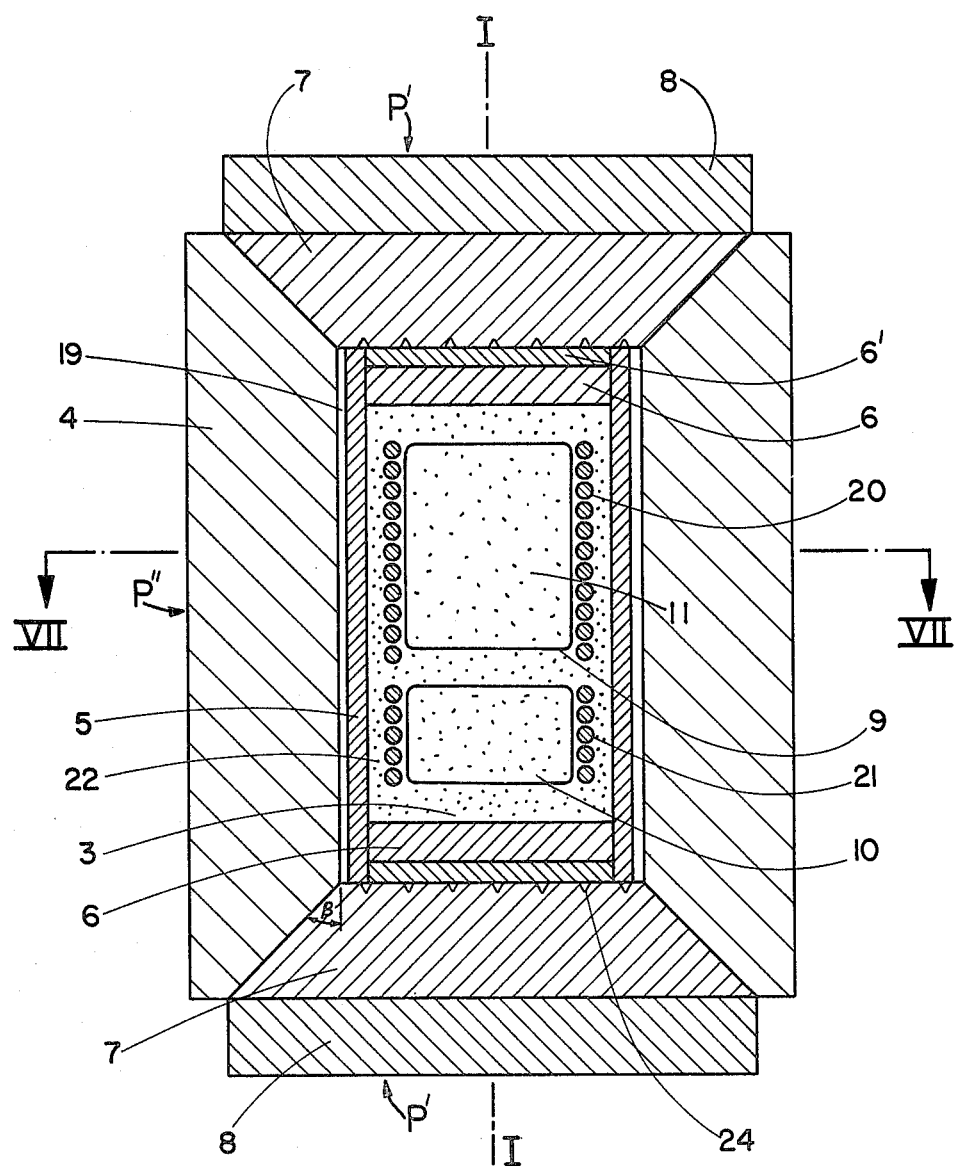
FIG. 6 is a sectional view of a reaction vessel which is similar to that of FIG. 3 showing a longitudinally directed space defined between the inner housing and the outer shell of the reaction vessel.
Figure 7:
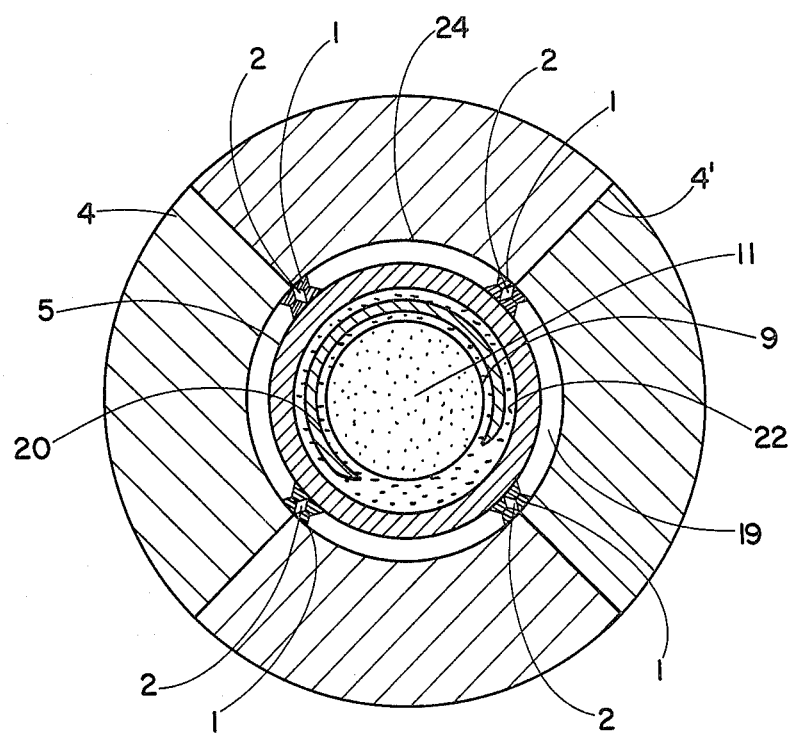
FIG. 7 is a sectional view of the reaction vessel of FIG. 6 at right angles to the vessel's geometric axis taken along lines VII-VII and showing a plurality of truncated pyramids in the longitudinal space.

In a slightly different form, the cooling system may be provided by a plurality of truncated pyramids 1 of steel, diamond powder or boron nitride, shown in FIG. 1. These pyramids are wedged between the outer surface of tube 5 and the inner surface of pieces 4 of the outer shell of the vessel. FIG. 6 illustrates a reaction vessel similar to that of FIG. 1 except a space 19, for accommodating the truncated pyramids 1, is defined between the outer surface of tube 5 and the inner surface of longitudinal pieces 4. FIG. 7 shows the truncated pyramids 1 wedged into the space 19 and arranged, as illustrated in FIG. 1 to define channels therebetween. It is known that the specific compression strength of steel measured in the small surface of a truncated pyramid or cone is generally many times greater than the ordinary compression strength of the steel. It is generally a function of the apex angle of the cone. These pyramids are arranged as shown in FIG. 1 to define an opening or hole 2 between them. The opening can be, for example, 1 mm$^2$. However, the size of the opening can vary greatly. When these pyramids extend the length of tubes 4 and 5 of the reaction vessel, the openings 2 provide fluid passage channels. Water or air may flow freely through these channels. Although the pressure on the truncated pyramids themselves can be as high as 70,000 atmospheres, the pressure within the channel may be only one atmosphere, thereby enabling the water or liquid to flow therethough at normal atmospheric pressure. The truncated steel pyramids or granules more or less form random pillars through which cold water or air may flow. Clearly, heat passes from a material at high pressure to flowing water at atmospheric pressure. The steel on which the truncated cones bear cannot be deformed, because of the small gap between the pyramids 1 (FIG. 1).

FIG. 2 illustrates a cooling mechanism which is identical in principle to that described above in FIG. 1. A groove 15 is milled on a steel plate 13. A plate 14 lies on the plate 13, whereby groove 15 becomes a closed channel, though of course it remains open at both ends. Its cross section is shown as triangular, though it can, of course, be variously formed (quadratic or rectangular). If it shows a tendency to deform, the groove can be filled with powder, giving support without blocking the channel. Grooves may be also milled on plate 14. They should correspond with the grooves 15 to be at approximate right angles to them. Granules filling a groove may be suspended in a glue-like substance, which boils off at low pressure, when the reaction in the vessel commences. The channels serve as fluid flow passageways for a cooling fluid suitably flowing under atmospheric pressure, to remove heat from the reaction chamber before it penetrates the outer steel protective cylinder formed from pieces 4. As in the FIG. 1 embodiment, the channels are arranged between the outer shell and the inner tube of the reaction vessel, as generally illustrated by numeral 24 of FIG. 3.

In a further embodiment of the cooling system, a material or lamina which melts at a pre-determined temperature when taking heat up under high pressure is provided between inner tube 5 and outer cylinder 4. In connection with D941 steel referred to on Page 9, the predetermined temperature may be as high as 20° C. and in connection with C550 steel, it should be not higher than 90° C. Such materials are known to the art, as, for example, frozen water mixed with common alcohol, which will freeze at room temperature and a pressure of 40 Kb. See the aformentioned texts entitled "Modern Very High Pressure Techniques" and "The Physics of High Pressure." The frozen liquid serves as a temperature barrier for a short time as the liquid melts.

Another embodiment of a cooling system useful in the described reaction vessel includes small, but durable, tubing, extending, for example, through the annular chamber defined between the inner tube 5 and the pieces 4 forming the outer shell of the reaction vessel.

Water flows through said tubing and transports heat out of the vessel before it penetrates the thick-walled steel pieces 4 of the outer cylinder. The material from which such tubing may be formed in conventional and known to the art.

In another embodiment similar to the ones discussed with respect to FIGS. 1 and 2, a layer of diamond powder, boron nitride or metal carbide, about one millimeter thick, can be sandwiched between two fairly thin but durable sheets of steel, each being about 5 millimeters thick. The powder is preferably graded so that the granules are of the approximate same size. Pressure from the reaction vessel bears on the outside of the two sheets, and the granules or crystals form more or less random pillars through which cold water can flow. Heat passes from the material at high pressure within the reaction chamber to water flowing at atmospheric pressure through the granules.

It is apparent from the above discussion that the cooling systems provided by the present invention enable a fluid (for example, cold water or cool air) to flow in an annular chamber defined between a thin, strong and ductile steel inner tube defining a reaction chamber and a thicker outer steel protective housing. The fluid flows through this annular chamber suitably at atmospheric pressure and removes heat from the reaction space before this heat can penetrate and cause damage to the outer steel housing. It is also apparent that the space required for the cooling system is relatively small in comparison to the overall volume of the vessel. However, this smaller cooling system eliminates the need for the thick-walled shell of insulating material required by the known reaction vessels. Thus, the size of the graphite raw material provided in the reaction space can be of a significantly larger volume than could be provided in the known reaction vessels. Accordingly, the volume of diamond powder or the size of the diamonds formed from the reaction can be up to a thousand times larger than those formed in the known reaction vessels.

Thus, the present invention has applied cooling techniques which are generally known in low pressure or atmospheric applications to a high pressure reaction vessel to eliminate bulky insulation material, thereby increasing the size of the reaction space and, consequently, the volumetric size of the product of the reaction.

Although the invention has been specifically described in connection with the production of diamonds, it should be understood that the process and the apparatus disclosed herein is equally applicable to the production of diamond powder and boron nitride, which is a crystalline powder-like substance which is as hard as or even harder than a diamond.

The above-described embodiments of the present invention have been provided for illustrative purposes only. Thus, for example, although the preferred embodiment of the invention discussed above discloses a cylindrical reaction vessel, this is not intended to limit the scope of the invention. In any event, the scope of the invention is defined by the following claims and all equivalents thereto.

I claim:

1. A reaction vessel for use in a high temperature, high pressure process for forming diamonds, diamond powder, boron nitride and similar substances, said reaction vessel including:
    an inner hollow housing defining a reaction chamber therein,
    an outer shell surrounding and supporting said inner housing to transfer pressure applied to the outer surface of said outer shell, to said inner housing and said reaction chamber, and
    a fluid flow passageway provided between said inner housing and said outer shell through which flows a cooling fluid for receiving and transporting heat from the reaction chamber of the reaction vessel before said heat penetrates said outer shell.

2. A reaction vessel as claimed in claim 1, wherein said inner housing and said outer shell are cyclindrically shaped and concentrically arranged.

3. A reaction vessel as claimed in claim 2, wherein said fluid flow passageway between said inner housing and said outer shell is defined by openings between plurality of truncated cones mounted between said inner housing and said outer shell, said truncated cones being arranged to define fluid flow channels therebetween.

4. A reaction vessel as claimed in claim 1, wherein said inner housing is formed from ductile steel.

5. A reaction vessel as claimed in claim 1, wherein said outer shell is formed from hardened steel.

6. A reaction vessel as claimed in claim 1, in which said fluid flow passageway is adapted to transport said cooling fluid therethrough at atmospheric pressure.

7. A reaction vessel as claimed in claim 3, wherein said vessel includes a material having a large coefficient of expansion located within the reaction chamber.

8. A reaction vessel as claimed in claim 7, further including means for selectively heating said material having said large coefficient of expansion for selectively controlling the pressure within said reaction chamber as a result of expansion of said heated material.

9. A reaction vessel as claimed in claim 8, wherein a first container is provided in said reaction chamber to hold said material having a large coefficient of expansion, and a second container is provided in said reaction chamber to hold graphite to be converted into diamond.

10. A reaction vessel as claimed in claim 9, wherein an insulation substance is provided in said reaction chamber between said first and second containers.

11. A reaction vessel as claimed in claim 10, wherein said insulation substance comprises silver sulphate.

12. A reaction vessel as claimed in claim 1, wherein said fluid flow passageway is formed from a plurality of grooves defined on the inner surface of said outer shell.

13. A reaction vessel as claimed in claim 1, wherein said fluid flow passageway is formed from a plurality of grooves defined on the outer surface of said inner housing.

14. A reaction vessel as claimed in any one of claims 12 or 13, wherein said plurality of grooves extend in the direction of said inner housing and said outer shell.

15. A reaction veseel for use in a high temperature, high pressure process for forming diamonds, diamond powder, boron nitride and similar substances, said reaction vessel including:
    an inner hollow housing defining a reaction chamber therein
    an outer shell surrounding and supporting said inner housing to transfer pressure applied to the outer surface of said outer shell, to said inner housing and said reaction chamber, and
    means in said outer shell for defining a fluid passageway for a cooling fluid for receiving and transferring heat from the reaction vessel before said heat substantially penetrates said outer shell.

16. A reaction vessel as claimed in claim 1, further including means adapted to provide a pressure in the reaction chamber in excess of 40 Kilobars.

17. A reaction vessel as claimed in claim 1, further including means adapted to provide a pressure in the reaction chamber of about 70 Kilobars.

* * * * *